Nov. 20, 1945.　　　J. J. DUGAS　　　2,389,490
TRANSMISSION DEVICE
Filed March 7, 1944　　　2 Sheets-Sheet 1

Inventor
J. J. Dugas
By Mason Fenwick & Lawrence
Attorneys

Nov. 20, 1945.　　　J. J. DUGAS　　　2,389,490
TRANSMISSION DEVICE
Filed March 7, 1944　　　2 Sheets-Sheet 2
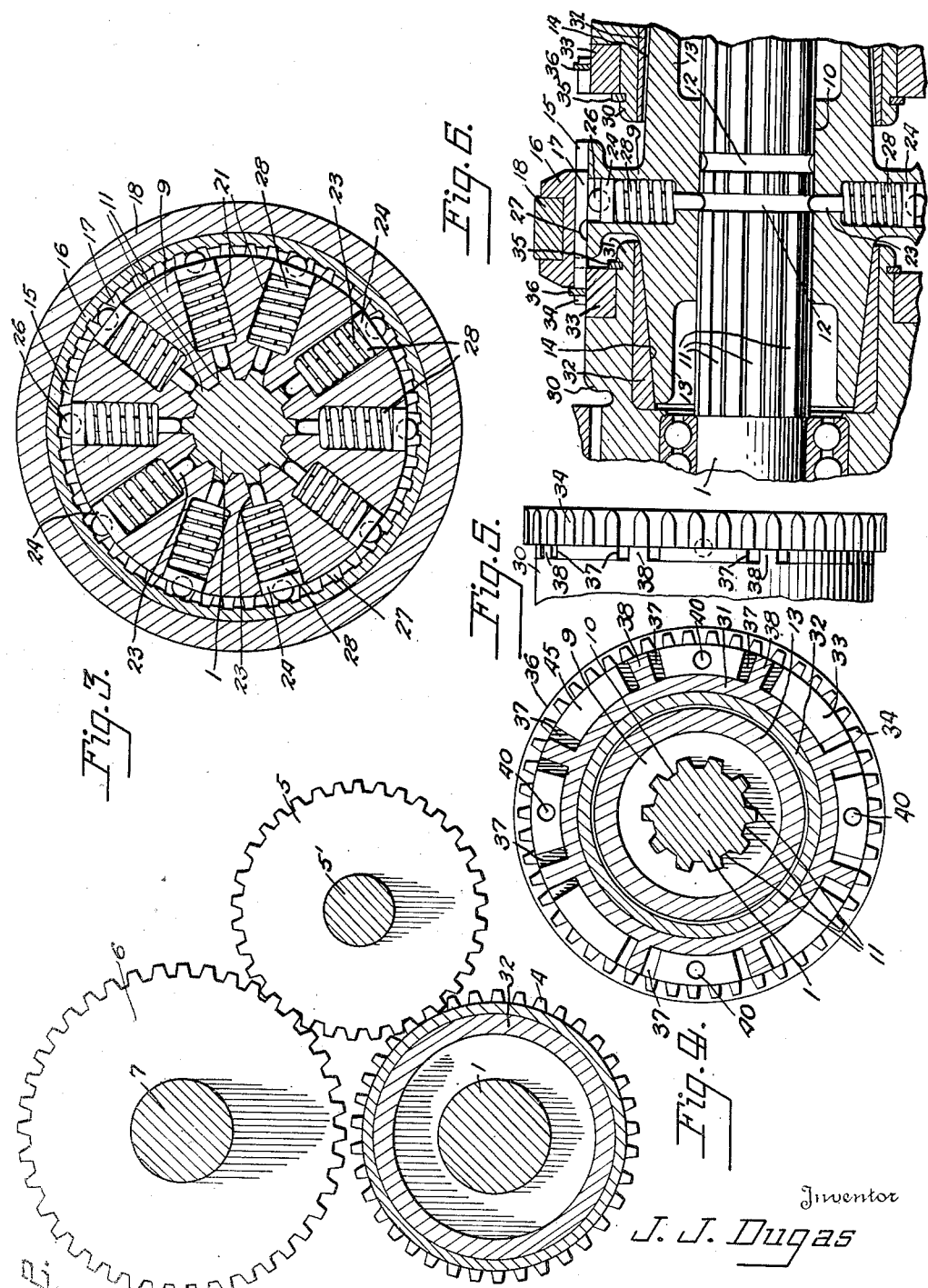
Inventor
J. J. Dugas
By Mason Fenwick & Lawrence
Attorneys Patented Nov. 20, 1945

2,389,490

UNITED STATES PATENT OFFICE 2,389,490

TRANSMISSION DEVICE

Joseph John Dugas, New Orleans, La., assignor to Higgins Industries, Inc., New Orleans, La., a corporation of Louisiana Application March 7, 1944, Serial No. 525,420

7 Claims. (Cl. 192—53)

This invention relates to transmission mechanism by means of which power may be transmitted as from an internal combustion engine or the like to the propeller or traction wheels of a vehicle and the direction reversed as desired.

More particularly, the invention relates to that type of transmission devices in which gears are selectively interengaged to provide positive transmission of the power and to improved means in connection with such gear transmissions, permitting the synchronization of the speeds of the gear elements prior to their interengagement, whereby the strains incident to such shifting of the gears are substantially eliminated, permitting the quick, precise alignment of the parts so that the operation requires no thought upon the part of the operator, or timing, and the minimum of exertion in the operation.

The object of the invention is to provide an improved, simplified and automatic transmission device with means for synchronizing the gears preliminary to interengagement quietly and with a minimum of strain and effort.

The invention consists in the novel construction, arrangement, and combinations of parts hereinafter more particularly described and claimed.

Two sheets of drawings accompany this specification as part thereof, in which like reference characters indicate like parts throughout.

Figure 2 is a transverse cross-section taken on line 2—2 of Figure 1;

Figure 3 is a transverse cross-section taken on line 3—3 of Figure 1;

Figure 4 is a vertical cross-section taken on line 4—4 of Figure 1;

Figure 5 is a fragmentary end view of the structure shown in Figure 4;

Figure 6 is a fragmentary vertical cross-section similar to that of Figure 1 showing the gears intermeshed to transmit power in a forward direction.

Figure 1:
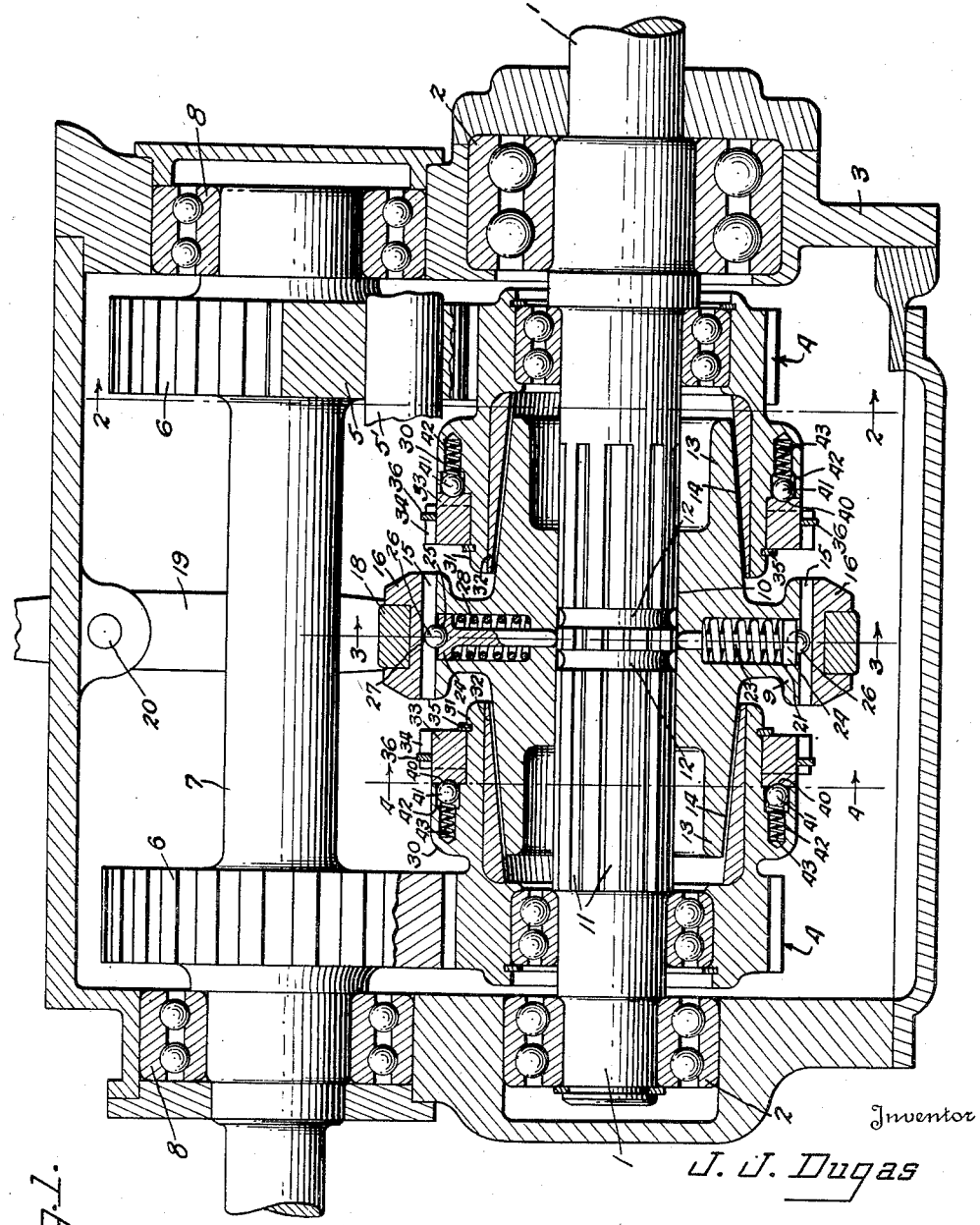
Figure 1 is a vertical, medial cross-section through a transmission including the present invention.

Referring to the drawings which illustrate a reverse power transmission system for marine use, 1 indicates the driven shaft from the propeller (not shown), which is mounted in suitable journals 2 in a housing 3.

Journaled upon the driven shaft 1 within the housing 3 are the gears 4—4 and one of these gears herein illustrated as the one positioned at the left end of the housing is adapted to intermesh continuously with one of a pair of gears 6 formed on the driving shaft 7, which is also suitably journaled in the housing 3 as by the bearings 8.

The other gear 4 at the right end of the housing 3 intermeshes with an idler gear 5 suitably journaled on a stub shaft 5' carried by the right-hand end of the housing 3 and the gear 5 is permanently intermeshed with the right-hand gear 6 on the driving shaft 7. Thus the gears 4—4 are continuously driven in opposite directions upon the driven shaft 1.

The present invention is directed to the improved means for selectively engaging one or the other of the gears 4 mounted on the driven shaft 1 to that shaft.

Intermediate the gears 4—4 the shaft 1 is provided with a plurality of circumferentially spaced, longitudinally extending keyways 11 adapted to slidingly receive the internal teeth 10 of a medial gear 9 positioned intermediate the gears 4—4 and slidable axially on shaft 1.

The slidable gear 9 is formed on its opposite faces with annular flanges 13, each having an outer conical friction face 14. The gear 9 is further provided with medially positioned external teeth 15 with which teeth the internal teeth 17 of a gear ring 16 are intermeshed so that the ring gear 16 can slide axially of gear 9.

The gear 9 is further provided with a plurality of radially extending, circumferentially spaced sockets 21 within which are radially slidable locking pins 23, having on their outer ends heads 24 and normally biased outwardly by means of compression springs 28. Each of the heads 24 of the locking pins 23 is provided with a cup-like depression 25 to receive a ball 26 adapted to ride in a medial annular groove 27 formed in the inwardly directed teeth 17 of the ring gear 16. The driven shaft 1 is provided with two spaced annular grooves 12—12 corresponding with the annular groove 27 in the ring gear 16 and the locking pins 23 are so proportioned in length that the balls 26 will be held in the annular groove 27 of ring gear 16 except when the locking pins 23 have been forcibly retracted against the force of spring 28 into the one or the other of the annular grooves 12—12. Similarly, the locking pins 23 will be held in one or the other of the annular grooves 12—12 except as the pins can be retracted by the entrance of balls 26 into the annular groove 27 of gear 16.

By reason of the structure thus far described, it will be apparent that medial gear 9, when in its central or neutral position, is slidable in either direction upon the shaft 1 but in this central or neutral position gear ring 16 is locked against any sliding motion upon gear 9. When the gear 9 is moved either to the right or left by means of power transmitted to gear ring 16 as by stirrup ring 18, which is connected to lever 19 pivoted to housing 3 as at 20, such axial movement will be arrested when the locking pins 23 are forced to enter one of the annular grooves 12, by reason of the cam action of the teeth of gear ring 16 upon the balls 26. Upon the entrance of the locking pins 23 into one of the annular grooves 12, the balls 26 will be depressed, permitting gear ring 16 to slide over the balls 26 for the purpose of engaging one or the other of the gears 4.

The structure of each of the gears 4—4 is identical, so that a description of one applies equally to both the gears, being oppositely disposed and each facing the medial gear 9.

Each of the gears 4 is formed with an inwardly directed annular flange 30, the inner portion of which 31 has a reduced diameter providing a seat for a slip ring 33. Within each of the annular flanges 30 is positioned an annular friction shoe 32 adapted to comate with the exterior conical friction face 14 of the gear 9.

The slip ring 33 is provided with outwardly directed gear teeth 34 adapted to comesh with the inwardly directed teeth 17 of the ring gear 16. Slip ring 33 is held in position upon the flange 31 as by a snap ring 35 and a similar snap ring 36 surrounds the slip ring 33 to act as a stop for the ring gear 16. The rear face of the slip ring 33 is provided with a plurality of circumferentially spaced notches 37 and the forward face of the annular flange 30 is provided with a plurality of circumferentially spaced lugs 38 adapted to seat within notches 37 on slip ring 33, with a clearance equal to two of the teeth 34 on slip ring 33.

The annular flange 30 of gear 4 is further provided with a plurality of sockets 42 adapted to provide seats for compression springs 43 and balls 41, and the portions of slip ring 33 intermediate the notches 37 are provided with medial cup-like depressions 40 within which the balls 41 are adapted to seat and thus frictionally maintain slip ring 33 in a medial position with respect to the lugs 38 and the notch openings 37. By reason of the above described structure of gear 4, it will be apparent that when gear ring 16 approaches slip ring 33 the latter is permitted a rotary adjustment with respect to flange 30 to the extent of two of the teeth of slip ring 33, so that regardless of the precise position of these teeth they can freely and readily adjust themselves to the position of the inwardly directed teeth 17 of the gear ring 16 and thus permit the intermeshing of these gears without any strain upon any of the teeth.

With the gears in the neutral position illustrated in Figure 1, the operation of the device to transmit power in one direction would consist in the swinging of lever 19 to force gear ring 16 to the left. At the outset of this motion, it will be noted that balls 26 are held seated in the annular groove 27 of gear ring 16, thus locking the gear ring to gear 9. When gear ring 16 and interlocked gear 9 have been advanced to the left a sufficient distance to permit the entrance of locking pins 23 into the left-hand annular groove 12, the camming action of the teeth of the gear ring 16 upon the balls 26 will force the locking pins 23 inwardly into annular groove 12, thus releasing gear ring 16 for slidable movement upon gear 9. This positioning of annular groove 12 on shaft 1 is adapted to coincide with the point at which the conical face 14 of flange 13 frictionally engages the shoe 32 carried by gear 4. Thus at the moment when gear ring 16 is released for axial movement upon gear 9, gear 9 is locked against further axial movement on shaft 1, while at the same time the flange 13 frictionally engages the shoe 32 of gear 4, thus beginning a preliminary frictional drive of gear 9, tending to increase gradually in speed to conform with that of gear 4. However, gear ring 16 being free to slide on gear 9 at this point does slide to the left and the ends of its teeth 17 engage the ends of the teeth 34 or intermediate said teeth, as the case may be, but in any event slip ring 33, being free to rotate upon flange 31 within the limit of two teeth, readily adjusts itself so that the teeth of gear ring 16 freely enter between the teeth 34 of slip ring 33, thus substituting a positive gear drive for the frictional drive initially prevailing between flange 13 and shoe 32. Thus it will be noted that gear 9 or gear ring 16 are successively locked against axial movement, one being free to move axially only when the other is locked.

Various modifications will suggest themselves to those skilled in the art but within the scope of the present invention, as claimed.

Having thus described my invention, I claim:

1. The combination of a shaft having circumferentially spaced longitudinally extending grooves, said grooves interrupted by annular grooves, freely rotatable gears on the shaft at each end of said grooves a medial gear formed with inwardly directed teeth complementary with the longitudinal grooves of the shaft and having radially disposed outwardly biased locking pins adapted to seat in an annular groove to lock the gear against axial movement on the shaft, with a slip ring gear axially slidable on the peripheral teeth of the medial gear, said slip ring formed with an annular groove and means adapted to seat in the annular groove of the slip ring operatively engaging the outer end of the locking pins, whereby said slip ring and gear are selectively interlocked against axial movement by said locking pins.

2. In a transmission system, the combination of axially spaced and aligned gears and an intermediate axially aligned axially slidable gear, means for selectively interengaging the slidable gear with said spaced gears comprising an axially slidable slip gear ring mounted on the peripheral teeth of the intermediate gear, exteriorly toothed rings rotatably mounted on each of the spaced gears and a lost motion connection associating each of said exteriorly toothed rings with the adjacent spaced gear limiting the rotary movement of said ring with respect to its supporting gear.

3. In a transmission system having axially spaced and aligned gears and an intermediate axially aligned axially slidable gear, means for selectively interengaging the slidable gear with said spaced gears, comprising an axially slidable slip gear ring mounted on the peripheral teeth of the intermediate gear, exteriorly toothed rings rotatably mounted on each of the spaced gears, said rings having rearwardly directed lugs adapted to seat between forwardly directed lugs formed on each of the spaced gears to limit the rotary motion of each ring with respect to its supporting gear, and spring pressed detents carried by each gear adapted to bear against the lugs of a ring to normally center the ring with its lugs intermediate the adjacent lugs of the gear.

4. In a transmission system, the combination of spaced axially aligned gears, an intermediate axially aligned axially slidable gear, interengaging members carried by each of said gears, means for interlocking the medial gear and its interengaging member to prevent simultaneous operation thereof and means including a lost motion connection between each of the spaced gears and its interengaging member.

5. In a transmission system having a shaft, axially spaced and aligned gears and an intermediate axially aligned axially slidable gear, an axially slidable slip ring gear mounted on the peripheral teeth of the intermediate gear, said ring formed with an annular groove medial of its inwardly directed teeth, radial locking pins extending through the intermediate gear with their inner ends engaging the shaft and their outer ends engaging said annular groove of the ring gear, spaced annular grooves formed in the shaft complementary to the groove in the ring gear, exteriorly toothed rings, one rotatably mounted on each of the spaced gears, said toothed rings formed with rearwardly directed lugs, complementary lugs on each of the spaced gears between which the lugs on the rings seat, restricting the rotary motion of each ring and means biasing the ring lugs to positions medial of the gear lugs.

6. In a transmission system, axially aligned driving and driven gears, one of said gears axially slidable with respect to the other, said gears formed with complementary braking surfaces on their adjacent faces, interengaging parts carried by said gears adapted to rigidly associate them, means associated with the axially slidable gear to interlock that gear with the interengagement part carried thereby and with the shaft on which it slides successively and means associated with the other gear to allow lost motion between that gear and the interengagement part carried by it whereby the axially slidable gear will be locked against slidable movement when its interengaging part is released and the interengagement member of the other gear can adjust itself for engagement.

7. In a transmission system, axially aligned driving and driven gears, one of said gears axially slidable with respect to the other, said gears formed with complementary clutch surfaces on their adjacent faces, interengaging parts carried by said gears adapted to rigidly associate them, means associated with the axially slidable gear to interlock that gear with the interengagement part carried thereby until the complementary clutch surfaces become effective and with the shaft on which it slides during the engagement of the interengagement parts and means associated with the other gear to allow lost motion between that gear and the interengagement part carried by it whereby the axially slidable gear will be locked against slidable movement when its interengaging part is released and the interengagement member of the other gear can adjust itself for engagement.

JOSEPH JOHN DUGAS.